(12) United States Patent
Magnani et al.

(10) Patent No.: US 11,981,466 B2
(45) Date of Patent: May 14, 2024

(54) METHOD AND PACKAGING MACHINE FOR MANUFACTURING A COMPOSTABLE POD FOR BREWING PRODUCTS AND COMPOSTABLE POD FOR BREWING PRODUCTS

(71) Applicant: SOCIETE DES PRODUITS NESTLE S.A., Vevey (CH)

(72) Inventors: Franco Magnani, Fidenza (IT); Massimiliano Maini, Fidenza (IT)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 17/266,315

(22) PCT Filed: Aug. 7, 2019

(86) PCT No.: PCT/IB2019/056704
§ 371 (c)(1),
(2) Date: Feb. 5, 2021

(87) PCT Pub. No.: WO2020/031096
PCT Pub. Date: Feb. 13, 2020

(65) Prior Publication Data
US 2021/0300609 A1 Sep. 30, 2021

(30) Foreign Application Priority Data
Aug. 10, 2018 (IT) .......................... 102018000008032

(51) Int. Cl.
*B65B 29/02* (2006.01)
*B65B 9/04* (2006.01)
(Continued)

(52) U.S. Cl.
CPC ............ *B65B 29/025* (2017.08); *B65B 9/042* (2013.01); *B65B 47/04* (2013.01); *B65B 61/00* (2013.01);
(Continued)

(58) Field of Classification Search
CPC ...... B65D 85/804–8067; B65D 65/466; B65B 29/025; B65B 9/042; B65B 47/04
See application file for complete search history.

(56) References Cited

U.S. PATENT DOCUMENTS 2,292,101 A * 8/1942 Brown ............... B65D 85/8061
426/77
9,039,589 B2 5/2015 Rivera
(Continued)

FOREIGN PATENT DOCUMENTS

EP 1705122 A1 9/2006
EP 2223869 A1 9/2010
(Continued)

OTHER PUBLICATIONS

Blanc, WO 2008/155226 Dec. 2008, Machine Translation.*
(Continued)

*Primary Examiner* — Drew E Becker
*Assistant Examiner* — Chaim A Smith
(74) *Attorney, Agent, or Firm* — K&L Gates LLP

(57) ABSTRACT

A method for manufacturing a compostable pod for brewing products envisages preparing a first and a second sheet made of biodegradable material with gas barrier properties, shaping the first and the second sheet so as to make at least a first and a second concave portion, filling the first concave portion with a predetermined quantity of brewing product
(Continued)

and joining the first concave portion to the second concave portion so that the respective concavities are opposite one another and define a casing for the brewing product. The shaping steps of the first and the second sheet envisage moistening at least a first portion of the first sheet and a second portion of said second sheet, configuring the first and the second portion so as to make the first and the second concave portion and drying the first and the second concave portion.

10 Claims, 3 Drawing Sheets

(51) Int. Cl.
 B65B 47/04 (2006.01)
 B65B 61/00 (2006.01)
 B65D 65/46 (2006.01)
 B65D 85/804 (2006.01)
(52) U.S. Cl.
 CPC ....... *B65D 65/466* (2013.01); *B65D 85/8046* (2013.01)

(56) References Cited

U.S. PATENT DOCUMENTS

2007/0215678 A1* 9/2007 Swoboda ........... B65D 81/3874
 428/211.1
2015/0151508 A1* 6/2015 Planchard ............... B29C 53/04
 442/361

FOREIGN PATENT DOCUMENTS

| EP | 2829482 B1 | 7/2018 |
| FR | 1169093 A | 12/1958 |
| WO | 2007116357 A2 | 10/2007 |
| WO | 2008155226 A1 | 12/2008 |
| WO | 2017222983 A1 | 12/2017 |

OTHER PUBLICATIONS

Blanc, WO 2008/155226, Machine Translation, Dec. 24, 2008 (Year: 2008).*
International Search Report and Written Opinion dated Nov. 8, 2019 from counterpart International Patent Application No. PCT/IB2019/056704.
European Office Action for Appl No. 22179412.6 dated Apr. 17, 2023.

* cited by examiner

METHOD AND PACKAGING MACHINE FOR MANUFACTURING A COMPOSTABLE POD FOR BREWING PRODUCTS AND COMPOSTABLE POD FOR BREWING PRODUCTS

This application is the National Phase of International Application PCT/IB2019/056704 filed Aug. 7, 2019 which designated the U.S.

This application claims priority to Italian Patent Application No. 102018000008032 filed Aug. 10, 2018, which application is incorporated by reference herein.

The present invention relates to a method and a packaging machine for manufacturing a compostable pod for brewing products, and a compostable pod for brewing products.

The main application area of the present invention is the food industry and, more particularly, the technical field of manufacturing pods for brewing products, such as coffee, tea, and the like.

In recent years, in the field of brewing products, packaging solutions such as capsules and pods have become increasingly popular as they make the products easy to use with specific machines that reduce the time required to prepare the beverage.

Of the two main solutions, pods have been regarded as preferable owing to the fact that only biodegradable material (e.g. filter paper) comes into contact with the product. However, the focus has increasingly shifted towards improving the quality of capsules, both for reasons of economy and because the latter preserve the product's organoleptic properties better.

With capsules, there is no need for any additional packaging apart from the capsule itself and, by their very nature, they provide a gas barrier which preserves the quality of the product they contain for a long time.

For this reason, some manufacturers have recently decided to modify the "pod" concept, and started to develop versions that, while continuing to feature the famous disk shape, are made of materials such as aluminium or the like capable of providing a gas barrier.

Unfortunately, this solution is at odds with the significant rise in environmental awareness among institutions and consumers in recent years.

Thus, at present, none of the solutions available on the market are able to combine the quality of pods made of barrier material with the environmental sustainability of conventional pods, made of filter paper.

The purpose of the present invention is therefore to overcome the drawbacks of the prior art mentioned above.

In particular, the purpose of the present invention is to provide a method and a packaging machine which make it possible to manufacture a pod for brewing products that is both compostable and provides a gas barrier effect.

Said purpose is achieved with a method for manufacturing a compostable pod for brewing products having the characteristics disclosed in one or more of claims 1 to 5, and a packaging machine for manufacturing a compostable pod for brewing products having the characteristics disclosed in claim 9.

In particular, the method involves preparing a first and a second sheet of biodegradable material with gas barrier properties.

Preferably, it involves a step of shaping said first sheet so as to make at least a first concave portion.

Preferably, a shaping of said second sheet so as to make at least a second concave portion is involved.

Preferably, it involves filling the first concave portion with a predetermined quantity of brewing product.

Preferably, the first and the second concave portions are joined together so that the respective concavities are opposite one another and define a casing for said brewing product.

According to one aspect of the present invention, the steps of shaping the first and the second sheet involve moistening at least a first portion of said first sheet and a second portion of said second sheet.

Preferably, furthermore, it involves configuring said first and said second portions so as to make said first and said second concave portions.

Preferably, a step of drying the first and the second concave portions is involved.

Advantageously, thanks to the moistening step, the cellulosic components of the biodegradable material with gas barrier properties can be made more malleable, so that the moistened portions can be configured by means of stamping or other methods known in the prior art.

Moreover, the subsequent drying step allows the moistened and shaped material to crystallise, so that it maintains the correct shape in order to be filled and the pod sealed.

Thanks to this method, it is therefore possible to manufacture a compostable pod with gas barrier properties in a simple manner that is cost-effective for the manufacturer.

The subject of the present invention also comprises a shaping station and a packaging machine for manufacturing a compostable pod for brewing products comprising said shaping station.

The shaping station comprises a feeding unit of at least one sheet of biodegradable material with gas barrier properties.

Preferably, at least one humidification device, for humidifying at least a portion of said sheet, and at least one configuration device, operationally arranged downstream of the humidification device, are provided.

According to one aspect of the invention, the configuration device is provided with a shaping body configured to give said portion a concave shape.

Furthermore, heating means are preferably provided and configured to dry said portion so that said concave configuration is maintained.

The packaging machine is provided with a first shaping station configured to provide a first sheet of biodegradable material with gas barrier properties provided with at least a first concave portion and with a second shaping station configured to provide a second sheet of biodegradable material with gas barrier properties provided with at least a second concave portion.

Furthermore, a filling station is operationally arranged downstream of said first shaping station and configured to fill said first concave portion with a predetermined quantity of brewing product.

Lastly, a joining station is operationally arranged downstream of said filling station and is configured to join said second concave portion to said first concave portion so that the respective concavities are opposite one another and define a casing for said brewing product.

These and other characteristics, together with their respective advantages, will be more apparent from the exemplary, and therefore non-limiting, description that follows of a preferred, and therefore non-exclusive, embodiment of a machine and of a method for manufacturing a compostable pod for brewing products according to what is shown in the accompanying figures, wherein.

Figure 1:
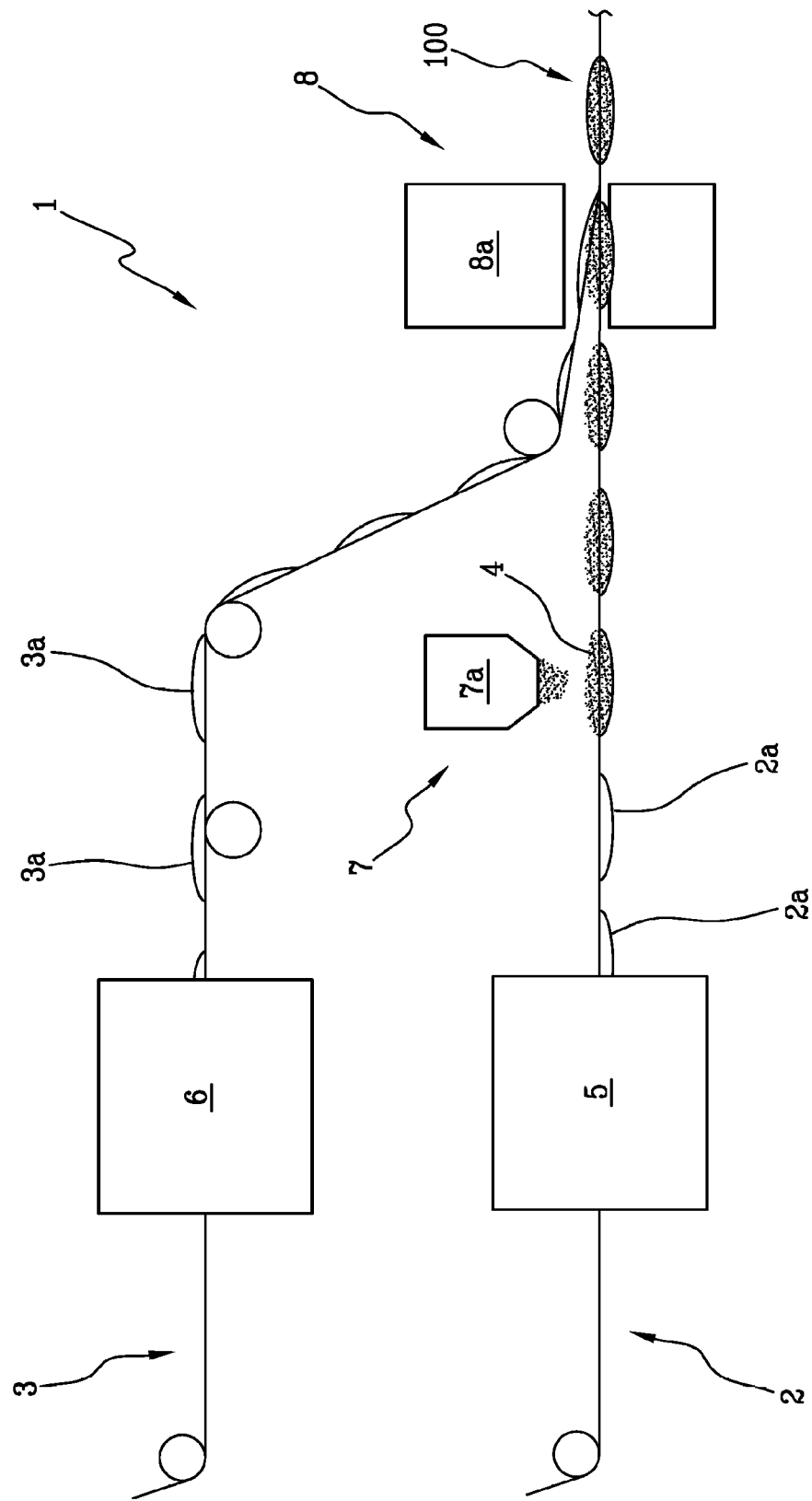
FIG. 1 shows a schematic vertical perspective view of a packaging machine for manufacturing a compostable pod for brewing products according to the present invention.
Figure 2:
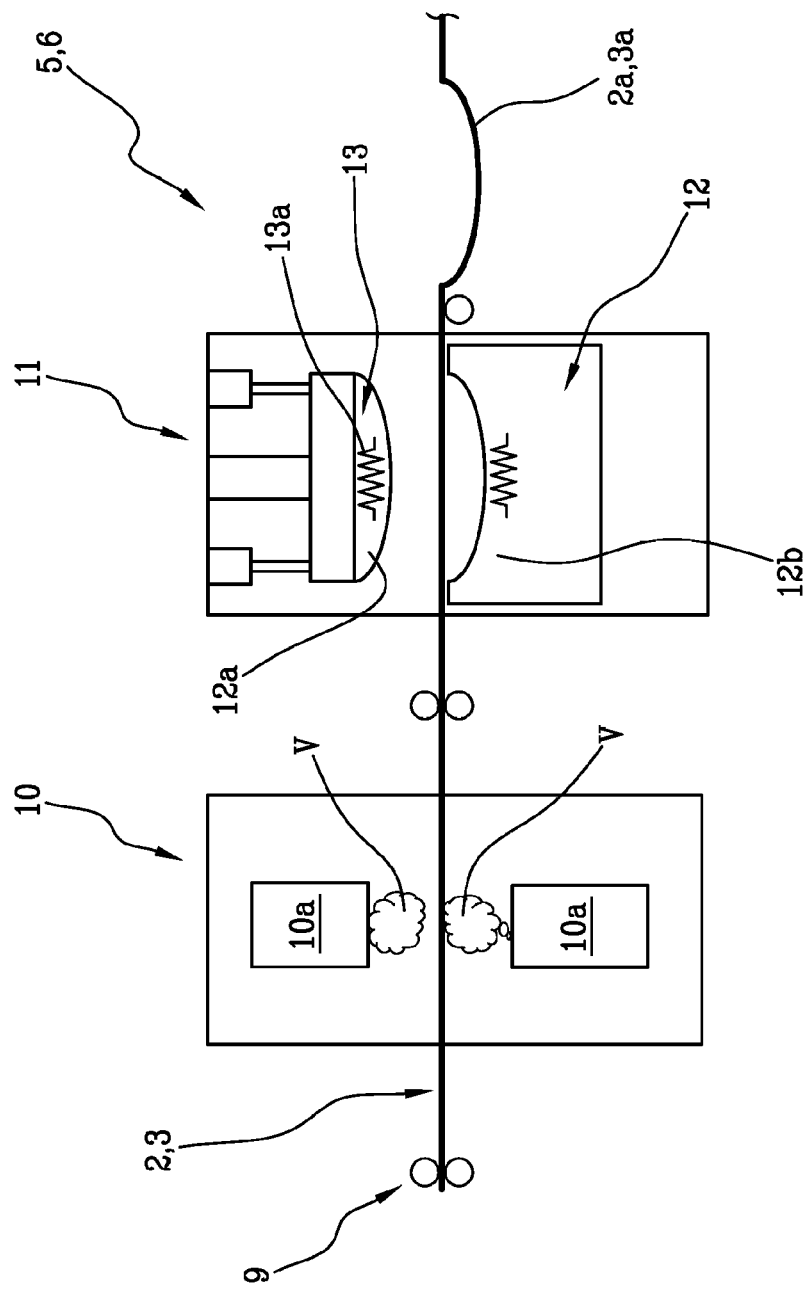
FIG. 2 shows a schematic vertical perspective view of a shaping station for the packaging machine in FIG. 1.
Figure 3A:
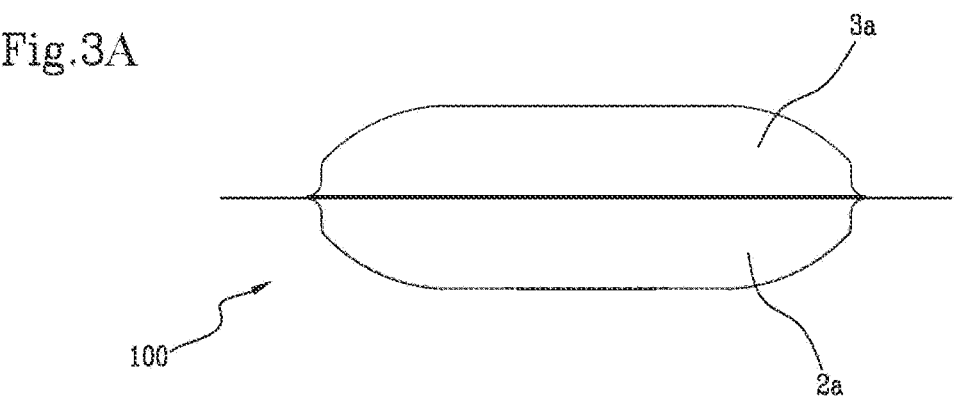
FIGS. 3A and 3B show a side view of a pod 1 00 manufactured with the packaging machine in FIG. 1 and a single preformed concave portion manufactured with the shaping station in FIG. 2.
Figure 3B:
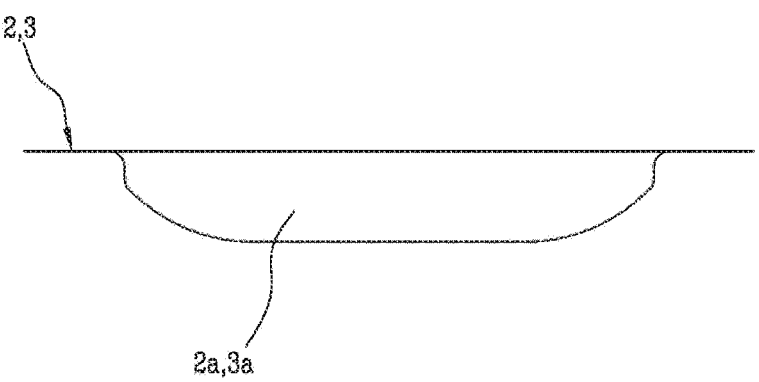

With reference to the accompanying figures, reference numeral 1 denotes a packaging machine used to implement the method for manufacturing a compostable pod for brewing products according to the present invention.

The machine 1, as well as the manufacturing method implemented thereby, are therefore intended for use in the manufacture and production of single-use compostable pods, of the type used to prepare beverages, primarily hot beverages, by brewing or percolation.

In general, the pod 100 is an element composed of a first concave portion 2a and a second concave portion 3a which are joined together so that the respective concavities are opposite one another and define a casing inside which a predetermined quantity of brewing product is placed.

It should be noted that the pods 100 manufactured with the machine and the method according to the present invention may differ in type and may contain a wide variety of brewing products, such as coffee (preferred), tea, herbal teas, and the like.

From a procedural point of view, first of all a first 2 and a second sheet 3 of biodegradable material with gas barrier properties are prepared.

The term "sheet" is used here to define any flexible element having a planar extension and two-level faces opposite one another.

It should be noted that the term "sheet" is used to encompass both elements having a clearly-defined planar extension as well as rolls of material wherein the length of the material is much greater than its width.

The spirit of the invention is meant to encompass both "in line" solutions and more stationary solutions, in which single sheets of material are processed discreetly.

The first 2 or the second sheet 3 of biodegradable material with gas barrier properties is preferably made of a composite material having a cellulosic component and a biopolymeric or bioplastic component.

Said material has absolutely no fossil or petroleum-derived content and can therefore be considered wholly compostable or biodegradable in accordance with even the strictest requirements of national legislation.

According to a preferred embodiment, the biodegradable material with gas barrier properties has a basis weight of between 90 and 150 grams.

Preferably, the biodegradable material with gas barrier properties comprises a plurality of superimposed layers, including one or more of the following:
- a non-woven fabric comprising at least 40% biodegradable fibres by weight, and preferably by total weight;
- a layer of adhesive that is suitable for coming into contact with foodstuffs and, in any case, less than 5% by weight of the material;
- a barrier medium capable of reducing gas permeability, such as vegetable parchment or the like.

The biodegradable fibres used may be chosen, for instance, from a group containing:
PLA (polylactic acid),
PHA (polyhydroxyalkanoates);
PHB (poly-p-hydroxybutyrate);
PHB(V) (poly hydroxybutyrate-co-hydroxyvalerate);
PBS (polybutylene succinate);
biopolyester;
cellulosic fibres such as cotton, linen and wood fibres.

The adhesive layer, if present, is preferably of the acrylic type.

The method for manufacturing the pod 100 must generally comprise a step of shaping the first 2 and the second sheet 3 so as to make the first concave portion 2a on the first sheet 2 and the second concave portion 3a on the second sheet 3.

Preferably, a succession of first concave portions 2a are made on the first sheet 2 and a corresponding succession of second concave portions 3a are made on the second sheet 3.

It should be noted that, such shaping steps may be performed simultaneously or in successive steps, in a same station or in different stations, without in any case departing from the spirit of the present invention.

According to the invention, said steps of shaping the first 2 and the second sheet 3 envisage moistening at least a first portion of said first sheet 2 and a second portion of said second sheet 3.

Preferably, the humidification or impregnation of the portions of the sheets 2, 3 is performed by directing at least one steam flow at a predetermined temperature against the first and said second portion.

Alternatively, however, the humidification step could be performed using other methods. For example, the humidification step could be performed by nebulising a liquid (e.g. demineralised water) on the sheet 2, 3 or by impregnating the sheet 2, 3 using specific devices (baths, rollers, sponges).

According to the preferred embodiment, the step of moistening the first or the second portion is performed by directing two separate steam flows, which can preferably be controlled and adjusted separately, against the two faces of each first 2 or second sheet 3.

Advantageously, this allows the different layers of biodegradable material with gas barrier properties to be impregnated in different ways.

The shaping step further involves configuring the first and the second portion so as to make the first 2a and the second concave portion 3a.

In other words, the previously moistened portion of the first 2 and of the second sheet 3 is configured, for example by means of a punch, stamp or the like.

Advantageously, in this way the cellulosic fractions of the material are more malleable and the risk of breakage is considerably reduced, while maintaining production speeds compatible with the cycle times required to meet the demands of today's market.

Following, or at the same time as the configuration process, the first 2a and the second concave portion 3a are dried.

In other words, the drying step involves heating the first 2a and the second concave portion 3a, at the same time as or following said shaping step, in order to crystallise the shape of the material that has been obtained.

The concave portions 2a, 3a obtained from the shaping step are then used to manufacture the pod 100.

In particular, the first concave portion 2a is filled with a predetermined quantity 4 of brewing product, which, as already mentioned, may vary in type.

Lastly, the first concave portion 2a, filled with said quantity 4, is joined to the second concave portion 3a so that the respective concavities are opposite one another and define a casing for said brewing product.

Therefore, advantageously, the method that is the subject of the invention allows you to manufacture a pod 100 wherein both the first 2a and the second concave portion 3a are preformed and made of biodegradable material with gas barrier properties.

This method is implemented, for example, with the packaging machine 1 that is the subject of the invention.

This machine 1 comprises one or more shaping stations 5, 6, a filling station 7 and a joining station 8.

In particular, the machine 1 comprises a first shaping station 5 and a second shaping station 6.

The first shaping station 5 is configured to provide the first sheet 2 of biodegradable material provided with said first concave portion 2a, preferably with a succession of first concave portions 2a.

The second shaping station 6 is configured to provide the second sheet 3 of biodegradable material provided with said second concave portion 3a, preferably with a succession of second concave portions 3a.

It should be noted that the first 5 and the second shaping station 6 could be arranged within one device and could act simultaneously on the two sheets 2, 3, or they could be physically separate, without in any case departing from the spirit of the invention.

Each shaping station 5, 6 comprises a feeding unit 9 of the respective first 2 or second sheet 3 of biodegradable material with gas barrier properties.

This feeding unit 9 is configured to feed the sheet 2, 3 (or the strip) along a direction of travel "A".

Along said direction of travel "A" there is a humidification device 10 for humidifying at least a portion of the respective first 2 or second sheet 3.

Preferably, the humidification device 10 comprises at least one steam generator 10a configured to generate a steam flow "V" hitting the respective portion of the first 2 or second sheet 3.

According to the preferred embodiment, the humidification device 10 comprises two steam generators 10a arranged opposite one another, each directed towards a respective face of the first 2 or second sheet 3.

These steam generators 10a can preferably be controlled separately, to enable the differentiation and optimisation of the impregnation of each face of the sheet 2, 3.

Alternatively, however, other humidification systems could be used, such as nebuliser/spray nozzles or applicator rollers (e.g. with brushes or sponges).

Operationally downstream of the humidification device 10 there is a configuration device 11.

The configuration device 11 comprises at least one shaping body 12 and heating means 13.

The shaping body 12 is configured to give the impregnated portion of the sheet a concave configuration.

The heating means 13 are, instead, configured to dry said portion so that said concave configuration is maintained.

According to the preferred embodiment, the shaping body 12 comprises at least one stamp 12a (convex) able to move towards and away from a mould 12b (concave) with a mutually complementary shape.

In this way the portion of the first 2 or of the second sheet 3 is given its concave configuration.

Preferably, the heating means 13 comprise a heating body 13a connected to said stamp 12a and/or to said mould 12b in order to dry the concave portion 2a, 3a of the first 2 or second sheet 3 during the configuration.

Preferably, the heating body 13a is defined by at least one element incorporated in the stamp 12a or in the mould 12b.

According to the preferred embodiment, the shaping body 12 is configured to exert a compressive force of between 1000 and 3000 N.

The heating body 13a is, instead, preferably configured to increase the temperature of the stamp 12a or of the mould 12b to a temperature of between 50 and 130° C. during the configuration step.

Advantageously, in this way the accurate configuration of the concave portions 2a, 3a is achieved quickly and reliably.

The invention achieves its intended purposes and significant advantages are thus obtained.

The filling station 7 comprises a dispensing device 7a, of a type known in the prior art and therefore not described in detail here. The dispenser 7a may be of the type for dispensing pre-set weights or volumes, or of the timed type, without in any case departing from the spirit of the invention.

The joining station 8 may, in turn, vary in type. Preferably, an ultrasound welding device 8a (sonotrode) is used to avoid or limit the presence of adhesive.

However, a heat sealer or other system known in the prior art could easily be used instead.

Indeed, given the consecutive nature of the humidification and drying steps, with the shaping step performed between these, the risks of fractures and breaks in the biodegradable material, which is ill-suited to dry forming owing to its cellulosic components, are reduced to a minimum.

Moreover, performing the drying step during configuration means that the exact configuration is maintained, facilitating the subsequent steps of filling and joining and freeing the manufacturer from the need to use suction or vacuum systems to maintain such shape.

The invention claimed is:

1. A method for manufacturing a compostable pod for brewing products, the method comprising:
   preparing a first sheet and a second sheet made of biodegradable material with gas barrier properties;
   shaping the first sheet to make at least a first concave portion;
   shaping the second sheet to make at least a second concave portion;
   after shaping the first concave portion and the second concave portion, filling the first concave portion with a predetermined quantity of brewing product;
   joining the first concave portion to the second concave portion so that the respective concavities are opposite one another and define a casing for the brewing product;
   the shaping steps of the first sheet and of the second sheet comprising:
      moistening at least a portion of the first sheet and a portion of the second sheet;
      after moistening the portion of the first sheet and the portion of the second sheet, configuring the portion of the first sheet and the portion of the second sheet to make the first concave portion and the second concave portion; and
      after configuring the portion of the first sheet and the portion of the second sheet, drying the first concave portion and the second concave portion, wherein the drying is carried out by a heating member configured to dry the first concave portion and the second concave portion so that concave configurations of the first concave portion and the second concave portion is maintained,
   the biodegradable material comprises a plurality of superimposed layers comprising (i) a non-woven fabric comprising at least 40% biodegradable fibres by weight of the non-woven fabric and (ii) a layer of adhesive suitable for contact with foodstuffs.

2. The method according to claim 1, wherein the drying step comprises heating the first concave portion and the second concave portion simultaneously or following the configuring step.

3. The method according to claim 1, wherein the moistening step comprises directing at least one steam flow at a predetermined temperature against the portion of the first sheet and the portion of the second sheet.

4. The method according to claim 3, wherein each of the first sheet and the second sheet has two different faces; the moistening step being carried out by directing two different steam flows against the two different faces of each of the first sheet and the second sheet.

5. The method according to claim 1, wherein the configuring step comprises moving a shaping body comprising at least one convex stamp towards and away from a concave mould with a mutually complementary shape.

6. The method according to claim 1, wherein the biodegradable fibres in the non-woven fabric are at least 40% by total weight of the biodegradable material.

7. The method according to claim 1, wherein the biodegradable material comprises vegetable parchment.

8. The method according to claim 1, wherein the adhesive is acrylic.

9. The method according to claim 1, wherein the biodegradable fibres are selected from the group consisting of polylactic acid (PLA), polyhydroxyalkanoates (PHA); poly-β-hydroxybutyrate (PHB); polyhydroxybutyrate-co-hydroxyvalerate (PHBV); polybutylene succinate (PBS); biopolyester; and cotton, linen and wood fibres.

10. The method according to claim 1, wherein the non-woven fabric integrates barrier properties and is capable of reducing gas permeability.

* * * * *